(12) United States Patent
Murayama et al.

(10) Patent No.: US 11,931,726 B2
(45) Date of Patent: Mar. 19, 2024

(54) GOLD-SUPPORTING CATALYST (71) Applicants: TOKYO METROPOLITAN UNIVERSITY, Tokyo (JP); FUJI CHEMICAL CO., LTD., Osaka (JP); Yasuo Shibasaki, Sanyo-Onoda (JP)

(72) Inventors: Toru Murayama, Hachioji (JP); Masatake Haruta, Hachioji (JP); Takashi Takei, Hachioji (JP); Qianqian Zhu, Hachioji (JP); Yasunori Inoue, Hachioji (JP); Fumio Uchida, Osaka (JP); Kenji Maeda, Osaka (JP); Hiroshi Matsuo, Osaka (JP); Yasuo Shibasaki, Sanyo-Onoda (JP)

(73) Assignees: TOKYO METROPOLITAN UNIVERSITY, Tokyo (JP); FUJI CHEMICAL INDUSTRIES, LTD., Osaka (JP); Yasuo Shibasaki, Sanyo-Onoda (JP)

( * ) Notice: Subject to any disclaimer, the term of this patent is extended or adjusted under 35 U.S.C. 154(b) by 28 days.

(21) Appl. No.: 17/275,088

(22) PCT Filed: Sep. 6, 2019

(86) PCT No.: PCT/JP2019/035138
§ 371 (c)(1),
(2) Date: Mar. 10, 2021

(87) PCT Pub. No.: WO2020/054597
PCT Pub. Date: Mar. 19, 2020

(65) Prior Publication Data
US 2021/0252485 A1 Aug. 19, 2021

(30) Foreign Application Priority Data
Sep. 11, 2018 (JP) .................................. 2018-169721

(51) Int. Cl.
*B01J 23/52* (2006.01)
*B01J 21/16* (2006.01)
(Continued)

(52) U.S. Cl.
CPC ............... *B01J 23/52* (2013.01); *B01J 21/16* (2013.01); *B01J 35/023* (2013.01);
(Continued)

(58) Field of Classification Search
CPC . B01J 23/52; B01J 21/16; B01J 35/023; B01J 35/1014; B01J 35/1061; B01J 37/06; C01B 32/50
See application file for complete search history.

(56) References Cited

U.S. PATENT DOCUMENTS 4,299,730 A * 11/1981 Sommer .................. B01J 27/16
502/81
4,937,219 A 6/1990 Haruta et al.
(Continued)

FOREIGN PATENT DOCUMENTS

CN 100998940 A 7/2007
CN 101204655 A 6/2008
(Continued)

OTHER PUBLICATIONS

International Search Report dated Nov. 26, 2019, issued in counterpart International Application No. PCT/JP2019/035138, with English Translation. (4 pages).
(Continued)

*Primary Examiner* — Coris Fung
*Assistant Examiner* — Catriona M Corallo
(74) *Attorney, Agent, or Firm* — WHDA, LLP (57) ABSTRACT

The invention provides a gold-supporting catalyst comprising gold nanoparticles and a carrier consisting of porous ceramic obtained by firing a mixture comprising an alumi-
(Continued)

num compound, a lime component, and a plastic clay containing 1% by mass or less of feldspars and quartz, wherein the gold nanoparticles are supported in an amount of 0.01 to 10 parts by mass on the carrier based on 100 parts by mass of the carrier.

4 Claims, 7 Drawing Sheets

(51) Int. Cl.
    *B01J 35/02*     (2006.01)
    *B01J 35/10*     (2006.01)
    *B01J 37/06*     (2006.01)
    *C01B 32/50*     (2017.01)

(52) U.S. Cl.
    CPC ....... *B01J 35/1014* (2013.01); *B01J 35/1061* (2013.01); *B01J 37/06* (2013.01); *C01B 32/50* (2017.08)

(56) References Cited

U.S. PATENT DOCUMENTS

| | | |
|---|---|---|
| 2010/0197956 A1 | 8/2010 | Hagemeyer et al. |
| 2014/0031195 A1 | 1/2014 | Sakurai et al. |
| 2017/0274357 A1 | 9/2017 | Izumi |
| 2018/0185832 A1* | 7/2018 | Xiao ........................ B01J 37/08 |

FOREIGN PATENT DOCUMENTS

| | | |
|---|---|---|
| CN | 101596454 A | 12/2009 |
| CN | 102010184 A | 4/2011 |
| CN | 103002985 A | 3/2013 |
| CN | 107226709 A | 10/2017 |
| JP | 3-12934 B2 | 2/1991 |
| JP | 5-49338 B2 | 7/1993 |
| JP | 3571633 B2 | 9/2004 |
| JP | 2008-279439 A | 11/2008 |
| JP | 2010-527778 A | 8/2010 |
| JP | 4966596 B2 | 7/2012 |
| JP | 5255836 B2 | 8/2013 |
| JP | 2015-131985 A | 7/2015 |
| WO | 2011/106213 A1 | 9/2011 |
| WO | 2012/144532 A1 | 10/2012 |

OTHER PUBLICATIONS

Letaief et al., "Deposition of gold nanoparticles on organo-kaolinite—Application in electrocatalysis for carbon monoxide oxidation, Canadian" Journal of Chemistry, (2011), vol. 89, No. 7, pp. 845-853, Cited in ISR. (11 pages).

Rocha et al., "L-serine-functionalized montmorillonite decorated with Au nanoparticles: A new highly efficient catalyst for the reduction of 4-nitrophenol", Journal of Catalysis, Mar. 16, 2018, vol. 361, pp. 143-155, Cited in ISR. (13 pages).

Letaief et al., "Phenol acetylation under mild conditions catalyzed by gold nanoparticles supported on functional pre-acidified sepiolite", Applied Clay Science, (2011), vol. 53, pp. 236-243, Cited in ISR. ( 8 pages).

Zhang et al.,"Clay-based SiO2 as active support of gold nanoparticles for CO oxidation catalyst : Pivotal role of residual Al", Catalysis Communications, (2013), vol. 35, pp. 72-75, Cited in ISR. ( 4 pages).

Haruta et al., "Novel Gold Catalysts for the Oxidation of Carbon Monoxide", Chemistry Letters, (1987), pp. 405-408, Cited in Specification. (4 pages).

Haruta, "When Gold Is Not Noble: Catalysis by Nanoparticles", The Chemical Record, (2003), vol. 3, pp. 75-87. Cited in Specification. ( 13 pages).

Haruta, "Catalysis by Gold Nanoparticles", Surface Chemistry, (2005), vol. 26, No. 10, pp. 578-584. Cited in Specification. (7 pages).

* cited by examiner

Fig. 1

Gold-supporting porous ceramic of Example 3

10 nm

Gold-supporting porous ceramic of Example 4

Gold-supporting porous ceramic of Example 4 was used

Fig. 5

Gold-supporting porous ceramic of Example 4
Upper: before use in CO oxidation reaction
Lower: after use in CO oxidation reaction for 1 week

Gold-supporting porous ceramic of Example 10 was used

Fig. 8

Gold-supporting silica of Comparative Example 1 was used

Fig. 9

Gold-supporting alumina of Comparative Example 2 was used

Fig. 10

Comparative Example 2
Porous ceramic alone (without loading gold)

Fig. 11

GOLD-SUPPORTING CATALYST

TECHNICAL FIELD

The present invention relates to a gold-supporting catalyst.

BACKGROUND ART

Gold catalysts can allow an oxidation reaction to proceed even under conditions of a low temperature of 15 to 25° C., and the effective use of such low-temperature catalytic activity of gold catalysts is believed to enable a reduction in the use of heating energy. Gold catalysts are considered to be promising, in particular, as a carbon monoxide oxidation catalyst (Patent Literature (PTL) 1 and Non-patent Literature (NPL) 1).

However, gold catalysts have stronger metal-to-metal bonding properties than other metals, and coagulation of gold nanoparticles easily occurs. In this case, the catalytic performance may not be exhibited sufficiently. To address this problem, a technique of effectively bringing out the catalytic performance of gold by loading gold nanoparticles onto a carrier has been reported (PTL 2 and NPL 2).

For the materials of such carriers, the use of carbon materials, organic polymers, inorganic oxides, and the like has been studied. Of these, inorganic oxides are typically used since they are easily produced and have excellent heat resistance.

Examples of inorganic oxides for use as a catalyst carrier include activated alumina with a large surface area. Activated alumina for catalysts is usually provided in a granulated form, i.e., a powdery form, a granular form, or a ball-like form. In order to provide a catalyst with a structure in the form of, for example, a pipe or a plate, it is typical to use a method of producing a catalyst loaded on a carrier beforehand, and then providing it with the structure.

However, some inorganic oxides that have been generally used as catalyst carriers cannot bring out the catalytic activity of gold catalysts effectively. Thus, selecting carriers is important. For example, gold cannot be efficiently loaded onto zeolite when a nanosized gold catalyst is loaded onto zeolite by a precipitation method, which is commonly used as a technique for loading gold.

It is also necessary to use caution with the relationship between a gold catalyst and the water content in reaction gas. NPL 3 discloses the effect of water content on a CO oxidation reaction at an ordinary temperature for each type of carrier. NPL 3 discloses that the reaction gas must contain water for alumina and silica; however, the amount of water set in NPL 3 is in the range of up to 10000 ppm (=1%). The amount of saturated water vapor at 30° C. is about 4.2%, and the environment in a living space is often more humid than is assumed in NPL 3. In order to effectively bring out the catalytic activity of gold catalysts loaded on a conventional carrier, issues remain unsolved; i.e., it is necessary to maintain a humid environment suitable for each type of carrier, and provide equipment therefor.

CITATION LIST

Patent Literature

PTL 1: JPH03-12934B
PTL 2: JPH05-49338B

Non-Patent Literature

NPL 1: M. Haruta et al., Chem. Lett. 1987 (16), 405-408
NPL 2: M. Haruta, Chem. Record, 2003 (3), 75-87
NPL 3: Masatake Haruta, Surface Chemistry, 2005 (26), 578-584

SUMMARY OF INVENTION

Technical Problem

In view of the foregoing circumstances, an object of the present invention is to provide a highly active gold-supporting catalyst.

Solution to Problem

In order to achieve the above object, the present inventors conducted extensive research, and found that a highly active gold-supporting catalyst can be obtained by loading a predetermined amount of gold nanoparticles onto predetermined porous ceramic as a carrier of a gold-supporting catalyst. The present inventors conducted further research based on these findings. The present invention has thus been completed.

More specifically, the present invention provides the following gold-supporting catalyst.

Item 1.
A gold-supporting catalyst comprising
gold nanoparticles and
a carrier consisting of porous ceramic obtained by firing a mixture comprising an aluminum compound, a lime component, and a plastic clay containing 1% by mass or less of feldspars and quartz,
wherein the gold nanoparticles are supported in an amount of 0.01 to 10 parts by mass on the carrier based on 100 parts by mass of the carrier.

Item 2.
The gold-supporting catalyst according to Item 1,
wherein the average diameter of the gold nanoparticles is 10 nm or less.

Item 3.
The gold-supporting catalyst according to Item 1 or 2, wherein the aluminum compound is at least one member selected from the group consisting of aluminum hydroxide, aluminum hydrate, aluminum carbonate, and ammonium dawsonite ($NH_4AlCO_3(OH)_2$).

Item 4.
A method of using a gold-supporting catalyst, the method comprising introducing a CO-containing gas into the catalyst of any one of Items 1 to 3 in an atmosphere of a relative humidity of 0.1 to 100% and a temperature of −100 to 300° C.

Advantageous Effects of Invention

The gold-supporting catalyst of the present invention shows high activity.

DESCRIPTION OF EMBODIMENTS

The gold-supporting catalyst of the present invention is characterized by comprising gold nanoparticles and a carrier consisting of porous ceramic obtained by firing a mixture comprising an aluminum compound, a lime component, and a plastic clay containing 1% by mass or less of feldspars and quartz, wherein the gold nanoparticles are supported in an amount of 0.01 to 10 parts by mass on the carrier based on 100 parts by mass of the carrier.

1. Gold Nanoparticles

In the gold-supporting catalyst of the present invention, the loading amount of gold nanoparticles is 0.01 to 10 parts by mass, and preferably 0.01 to 5 parts by mass, based on 100 parts by mass of the carrier comprising the porous ceramic. If the loading amount of gold nanoparticles is less than 0.01 parts by mass, the effect of the gold catalyst cannot be sufficiently obtained. In contrast, if the loading amount of gold nanoparticles exceeds 10 parts by mass, a further effect is less likely to be obtained, and it is inefficient in terms of cost.

The gold catalyst for loading is gold nanoparticles. To increase the proportion of surface gold atoms with respect to the total gold atoms, the average particle size is preferably 0.3 to 10 nm, and more preferably 0.3 to 5 nm. In this specification, the average particle size of gold nanoparticles can be determined by a method of calculating the average value by creating a particle size distribution by transmission electron microscope (TEM) observation; a method of calculating the average value obtained by image analysis; or a method of calculating the average value from the half-width of the XRD peak.

The gold nanoparticles may be a pure gold substance. In addition to gold, however, it is preferable to contain one or more metal oxides selected from the group consisting of manganese, iron, cobalt, nickel, platinum, palladium, ruthenium, silver, and copper. In this case, the gold content in the gold nanoparticles is preferably 1 to 50 atom %, more preferably 2 to 20 atom %, and even more preferably 2 to 10 atom %.

The gold nanoparticles are considered to show catalytic activity in various reactions, such as carbon monoxide oxidation at low temperatures, water-gas shift reactions, reverse water-gas shift reactions, one-step gas-phase propylene epoxidation, direct hydrogen peroxide synthesis from oxygen and hydrogen, partial oxidation of hydrocarbons, hydrogenation of unsaturated compounds, oxidation of alcohol, removal of $NO_x$, and carbonylation of epoxy compounds and aliphatic amines. The gold-supporting catalyst of the present invention is also expected to show catalytic activity in reactions similar to the above. In particular, the gold-supporting catalyst of the present invention can be used as a catalyst that can burn, at low temperatures, carbon monoxide, which causes poisoning symptoms even in small amounts.

2. Porous Ceramic

In the present invention, the carrier of the gold nanoparticles is porous ceramic. The porous ceramic can be obtained by firing a mixture comprising an aluminum compound, a lime component, and a plastic clay containing 1% by mass or less of feldspars and quartz.

Conventionally, a clayey porcelain paste, which is a material of "porcelain," contains three main components, i.e., a quartz component as an aggregate, feldspars as a flux, and kaolinitic clay as a plasticizer and an aggregate. When the mixture mentioned above is fired, liquid phase sintering proceeds, and translucent porcelain is obtained. Softening progresses at around 1200° C., and mullite, undissolved quartz, and a small amount of bubbles are formed in the glass phase. The texture is translucent and milky white, with no water absorbency; it is a so-called porcelain texture.

In order to impart porosity to the ceramic obtained by firing, it is necessary to suppress the glass phase formation during the firing process. Examples of base materials with a reduced glass phase include insulator base materials, developed around 1900, that are obtained by adding alumina in an outer amount to a ceramic base material and firing it at a high temperature to remove water absorption properties while improving heat resistance and strength.

Alternatively, the formation of a glass phase may be extremely suppressed by a method of obtaining a sintered body by adding a high-melting-point alumina and/or lime component ($CaO-Al_2O_3-SiO_2$ system) to the porcelain paste. This sintered body, which has heat resistance (heat insulation) and is lightweight, has a history of being used as fireproof bricks for kiln tools. The crystalline phase after firing contains $\alpha$-$Al_2O_3$, mullite ($3Al_2O_3$-$2SiO_2$), anorthite ($CaAl_2Si_2O_8$), related compounds, and a small amount of glass phase. The sintered body has a feature of having many bubbles (µm to mm).

As another example, white cloud pottery (figurine) base materials were developed in the 1930s as a weight-saving measure in order to avoid tariffs on the weight of export goods. These base materials were obtained by replacing the feldspar composition of the ceramic base material with dolomite ($MgCa(CO_3)_2$). For the clay content, kibushi clay was used in a large amount to form a slurry whose viscosity is easily adjustable with water glass, making drain casting using a plaster mold possible. Accordingly, white cloud pottery (which is porous and lightweight), which can copy the expression of a doll, was actively produced. In the 1970s, white cloud pottery, which is porous and is fired at low temperatures (around 1000° C.), was found to have a weakness in terms of hydration expansion. The ceramic industry required measures to improve heat resistance and porcelain quality. Until the 1980s, the softening temperature successfully increased with the addition of an alumina material in an outer amount; however, the porosity, which was for the weight-saving measure, decreased.

The average diameter of the nanopores present in the porous ceramic in the gold-supporting catalyst of the present invention is preferably 2 to 50 nm, and more preferably 2 to 20 nm. When the average diameter of the nanopores present in the porous ceramic is within this numerical range, it is possible to obtain humidity control properties due to water vapor adsorption and desorption hysteresis.

The nanopores in the porous ceramic are preferably formed by foaming of the decomposition gas of the raw material mixture. The source of the foam for use is preferably one or more types of decomposition gas selected from the group consisting of $Al(OH)_3$, $Al_2Si_2O_5(OH)_4$, and $CaCO_3$. Since the nanopores of the porous ceramic are mainly affected by the thermal oscillation (mean free distance) of the decomposition gas, the size of the nanopores increases in accordance with the increase in the heating temperature, and nanopores with uniform and sharp pore size distribution are formed. The size distribution of the nanopores follows Gaussian distribution up to heating of 1400° C. The porous ceramic may also have pores with a pore diameter outside the above numerical range.

In the present specification, the average diameter of the nanopores of the porous ceramic is defined as a value obtained by pore size distribution analysis of the results of nitrogen adsorption measurement by the BJH method.

2.1. Plastic Clay

The plastic clay is not particularly limited as long as it contains 1% by mass or less of feldspars and quartz based on 100% by mass of the plastic clay, and known plastic clay can be widely used. Specifically, the plastic clay for use may be at least one member selected from the group consisting of kibushi clay, gairome clay, kaolinitic clay, bauxite clay, pottery clay, and various artificial clay.

Artificial clay is preferably those obtained based on analysis of synthetic technology due to the background of rapid depletion of resources of high-quality natural kaolinitic clay. Examples include those that are obtained by treatment for clay formation with a hydrothermally synthesized kaolinite, and that have a specific surface area, crystallinity (Hinckley index), etc., comparable to those of natural kaolinite to ensure excellent plasticity.

(Reference: Yasuo Shibasaki, The Present and the Future for *Synthetic Technology of Artificial Clay*, Resource Processing, 1991 (38), 173-178)

In the analysis of artificial clay, commercially available elutriated clay (kibushi clay, gairome clay) was thoroughly classified to study the existential state of $Fe_2O_3$ components and $TiO_2$ components as impurities. It was inferred whether the $Fe_2O_3$ components would be solid-soluted in kaolinite, or adsorbed on its surface. The $TiO_2$ components were found to be of mixed type.

(Reference: Yasuo Shibasaki, Takehisa Maeda, *Suihi kibushi nenndo, gairome nenndo tyuu no fujunbutsu (tetsu, titann) no sonnzai jyotai* [Existential state of impurities (iron, titanium) in elutriated kibushi clay or gairome clay], Reports of the Government Industrial Research Institute, Nagoya, 1979 (28), 270-274)

(Reference: Shinji Tomura, Masao Kitamura, Yasuo Shibasaki, Takehisa Maeda, *Gairome nenndo tyuu no tetsu no sonnzai jyoutai—bunnseki dennsi kenbikyo niyoru kennto* [Existential state of iron in gairome clay—Study with analytical electron microscope], Journal of the Ceramic Association, Japan, 1982 (90), 362-366)

To address the trend in shortage of clay resources and achieve higher purity, an attempt was made to synthesize kaolinitic artificial clay with the Engineering Research Association for Artificial Clay. The obtained results showed the characteristics of plastic clay; i.e., the atomic arrangement of kaolinite was disordered, and the particles had a high surface charge (up to 1 μm). The quality was greater than that of gairome clay.

(Patent Literature for reference: JPH06-99142B)
(Patent Literature for reference: JPH06-102536B)
(Reference: Yasuo Shibasaki, Masanobu Kamori, *Tennenn nenndo to jinnko nenndo* [Natural clay and artificial clay], Ceramics, 1992 (27), 740-746)

The price of artificial clay became about 10 times higher than the sales price of commercially available elutriated gairome clay. The addition of sugar alcohols enabled an improvement in the quality of this product to be comparable to that of kibushi clay.

(Patent Literature for reference: JPH05-49623B)

If the plastic clay contains more than 1% by mass of feldspars and quartz, which are impurities, the ceramic is easily softened during firing, causing deformation of the ceramic, melting of the constituent materials (glass phase formation), and loss of pores due to shrinkage. The content of feldspars and quartz is preferably as small as possible, and it is most preferable that feldspars and quartz are not contained at all.

It was found to be difficult to remove feldspars, fine quartz, $Fe_2O_3$ components, and $TiO_2$ components that are present as a mixture when clay ore was thoroughly elutriation-classified.

(Reference: Takehisa Maeda, Shinji Tomura, Hiroyuki Mizuta, Yasuo Shibasaki, Assessment of Quality Evaluation Methods of Clay Materials for Ceramic Industry, Clay Science, 1987 (27), 135-146)

In the present invention, the plastic clay containing 1% by mass or less of feldspars and quartz is preferably obtained by a method of obtaining elutriated clay by industrially elutriating clay ore, and by separating and removing coarse-grained quartz and feldspars as much as possible by centrifugation.

(Reference: Yasuo Shibasaki, *Ceramic tyoshitsu zairyo no kaihatsu no keii to genjo* [History and Present Status of Development of Ceramic Humidity-Controlled Materials], Ceramics, 2002 (37), 317-321)

In the present invention, feldspars refer to known feldspars, and are not particularly limited. Examples include tectosilicates with a three-dimensional structure comprising an aluminosilicate, such as alkali metals and alkaline earth metals, as its main component.

Specific examples include alkali feldspars, such as orthoclase, sanidine, microcline, and anorthoclase; and plagioclase, such as albite and anorthite. Examples also include, but are of course not limited to, celsian, paracelsian, banalsite, stronalsite, slawsonite, buddingtonite, kasoite, and feldspathoid. It is preferable to use the plastic clay disclosed in JP4966596B.

The quartz also refers to known quartz, and is not particularly limited. Examples include crystallized silicon dioxide.

The content of plastic clay is preferably 10 to 60% by mass, and more preferably 10 to 50% by mass, based on 100% by mass of the mixture comprising an aluminum compound, a lime component, and a plastic clay. By adopting this configuration, excellent plastic moldability can be imparted to the porous ceramic. The decomposition gas of the kaolinite component in the plastic clay serves as a source for forming nanopores.

The porous ceramic contains a plastic clay. Thus, when the base material is molded and then fired, porous ceramic can be obtained as a structure in the form of a plate, pipe, etc. Furthermore, by loading gold on the porous ceramic structure, gold-supporting porous ceramic having a plate-like shape, a pipe-like shape, or the like can be obtained.

2.2. Lime Component

The lime component is not particularly limited as long as it is a compound that contains calcium in its structural formula. Specifically, at least one member selected from the group consisting of calcium carbonate, basic calcium carbonate, quicklime (calcium oxide), slaked lime (calcium hydroxide), and the like may be used. Both natural and synthetic products thereof can be suitably used.

The content of the lime component is preferably 10 to 40% by mass, and more preferably 10 to 30% by mass, based on 100% by mass of the mixture comprising a plastic clay, a lime component and an aluminum compound. By adopting this configuration, the ceramic is prevented from being deformed during the firing process due to an increase in the melting point of the fired product. The decomposition gas of the lime component serves as a source for forming nanopores.

2.3. Aluminum Compound

The aluminum compound is not particularly limited as long as it is a compound that contains aluminum in its chemical formula. The compound is preferably a compound that is formed into alumina when fired at a high temperature of 800 to 1400° C. Specifically, it is preferable to use at least one member selected from the group consisting of aluminum hydroxide, aluminum hydrate (AlOOH), aluminum carbonate, and ammonium dawsonite ($NH_4AlCO_3(OH)_2$).

The content of the aluminum compound is preferably 10 to 60% by mass, and more preferably 15 to 50% by mass, based on 100% by mass of the mixture comprising a plastic clay, a lime component and an aluminum compound. By adopting this configuration, the ceramic is prevented from being deformed during the firing process. The decomposition gas of the aluminum compound serves as a source for forming nanopores.

2.4. Others

It is also preferable to add, as a porousing agent, at least one member selected from the group consisting of flammable organic substances, such as rice chaff, microbial colonies, and sugars serving as feed of microbial colonies, to the mixture comprising an aluminum compound, a lime component, and a plastic clay, which is the raw material of the porous ceramic of the present invention. This addition is made for the purpose of forming pores of micron order or larger, which serve as the pathway for gas etc. to access the nanopores. Many pores are formed due to the skeleton spaces formed as a result of combustion of the porousing agent (i.e., at least one member selected from the group consisting of flammable organic substances, such as rice chaff, microbial colonies, and sugars serving as feed of microbial colonies).

To introduce uniform micropores in the ceramic base material, microorganisms of a flammable organic substance and sugars serving as feed of the microorganisms were added and mixed, and the aged product was heated and fired. A uniform porous body with pores formed of skeleton spaces of microbial colonies with a pore diameter of 0.1 to 1.0 μm was obtained.

(Patent Literature for reference: JP3571633B)

The mixture comprising an aluminum compound, a lime component, and a plastic clay is not particularly limited, and can be obtained by mixing by known mixing methods. Examples include a ball milling process using water as a mixing medium and alumina balls as mixing media.

After molding and drying the mixture, firing is performed at a temperature of preferably 800 to 1400° C. to obtain porous ceramic.

The crystalline phase of the porous ceramic obtained by firing the above mixture varies depending on the sintering temperature. The porous ceramic of the present invention preferably contains at least one crystalline phase selected from the group consisting of $\alpha$-$Al_2O_3$ and $Al_2O_3$ other than $\alpha$-phase, and at least one crystalline phase selected from the group consisting of CaO, $Ca_2Al_2SiO_7$ (gehlenite), and $CaAl_2Si_2O_8$ (anorthite). The crystalline phase of ceramic can be confirmed by XRD measurement.

More specifically, the porous ceramic for use may be preferably those disclosed in the following documents.

JP4966596B; JP5255836B; *Tojiki seizo kara mizukasoseikei gijutu no kakuritsu e* [Establishment of Ceramic Production to Hydroplastic Molding Technology], Ceramics, 40(2), 106-110 (2005); Assessment of Quality Evaluation Methods of Clay Materials for Ceramic Industry, Clay Science, 27(3), 135-146 (1987); *New (nm takoshitsu) ceramic no seizo hoho no kaihatsu* [Development of Method for the Production of New (nm porous) Ceramic], New Ceramic Letters, 53 3-12 (2014); *Ceramic tyoshitsu zairyo no kaihatsu no keii to genjo* [History and Present Status of Development of Ceramic Humidity-Controlled Materials], Ceramics, 37(4), 317-321 (2002); and Invention and Development of Humidity-Controlled Materials, and Impression of Living in House Equipped with Humidity-Controlled Wall for Five Years, Journal of the Society of Inorganic Materials, Japan, 18, 437-443 (2011), all of these non-patent documents are by Yasuo Shibasaki et al.

Although humidity-controlled materials, separators for chromatography, refractory materials with high thermal shock resistance, catalyst carriers, and the like were supposed to be the applications of the porous ceramic disclosed in the above patent and non-patent documents, the porous ceramic is used in the present invention as a carrier of gold nanoparticle catalyst.

The method of loading gold nanoparticles onto a carrier comprising the porous ceramic is not particularly limited, and known methods can be widely used. Specific examples include an impregnation method, a coprecipitation method, a deposition-precipitation method, and a solid-phase mixing method.

More specifically, for example, the following method can be used.

A water-soluble gold compound, such as gold chloride, is dissolved in water to obtain an aqueous gold solution. The porous ceramic is immersed in the aqueous gold solution, and the pH is adjusted to allow the gold to be supported on the porous ceramic. The porous ceramic is removed from the aqueous gold solution and dried to thus obtain a gold-supporting porous ceramic catalyst.

As described above, the inventors of the present invention selected the porous ceramic as a carrier of the gold catalyst from among a vast variety of possible carrier candidates. The results surprisingly found not only that the activity of the gold catalyst can be maintained at a high level, but also that the activity of the gold catalyst can be maintained at a high level, even in an environment with a water content.

Embodiments of the present invention are described above. However, the present invention is not limited to these examples, and can of course be implemented in various forms within a scope that does not deviate from the spirit of the present invention.

EXAMPLES

Embodiments of the present invention will be described in more detail below, with reference to Examples; however, the present invention is not limited to these Examples.

Examples 1 to 12

Production of Porous Ceramic

In terms of a base material for ceramic firing (100% by mass), limestone (16% by mass), Al(OH)$_3$ (47% by mass), and kaolinitic clay (37% by mass) were mixed in this ratio to thus obtain a base material for ceramic firing. The base material for ceramic firing was molded into an arbitrary shape, dried, and then baked at 800° C. The resulting unglazed ceramic was fired again at 900° C. to obtain porous ceramic for use to support gold. The nanopores of the porous ceramic were evaluated by multi-point nitrogen adsorption measurement. The BET specific surface area of the porous ceramic was 43 m$^2$/g, and the average pore diameter calculated by the BJH method was 8 nm.

Loading Gold onto Porous Ceramic

The porous ceramic was immersed in an aqueous gold chloride solution and allowed to stand under the conditions of Examples 1 to 12 shown in Table 1 below, and further allowed to stand after adjusting the pH to 7 to 8. The ceramic was then removed from the aqueous gold chloride solution, washed with water, and dried to thus obtain a gold-supporting catalyst. Table 1 below shows the gold loading conditions and the catalytic performance ($T_{1/2}$ (° C.)) of each example.

TABLE 1

| | Au concentration in aqueous solution (mol/l) | Amount of Au added (mass %) | pH (after standing) | $T_{1/2}$ (° C.) | Au loading amount (mass %) |
|---|---|---|---|---|---|
| Example 1 | 0.018 | 6.0 | 6.75 | 40 | 3.34 |
| Example 2 | 0.018 | 6.0 | 6.66 | 34 | 3.21 |
| Example 3 | 0.009 | 2.9 | 7.08 | 8 | 1.93 |
| Example 4 | 0.009 | 3.1 | 8.02 | 10 | 2.03 |
| Example 5 | 0.009 | 3.0 | 7.37 | 19 | 2.31 |
| Example 6 | 0.009 | 3.0 | 6.92 | 16 | 2.29 |
| Example 7 | 0.004 | 1.6 | 9.53 | 54 | 0.99 |
| Example 8 | 0.004 | 1.5 | 7.29 | 17 | 1.08 |
| Example 9 | 0.003 | 1.0 | 9.43 | 39 | 0.66 |
| Example 10 | 0.007 | 5.2 | 8.54 | 6 | 2.04 |
| Example 11 | 0.007 | 11.4 | 7.74 | 8 | 5.10 |
| Example 12 | 0.018 | 6.1 | 6.17 | — | 1.31 |

Figure 1:
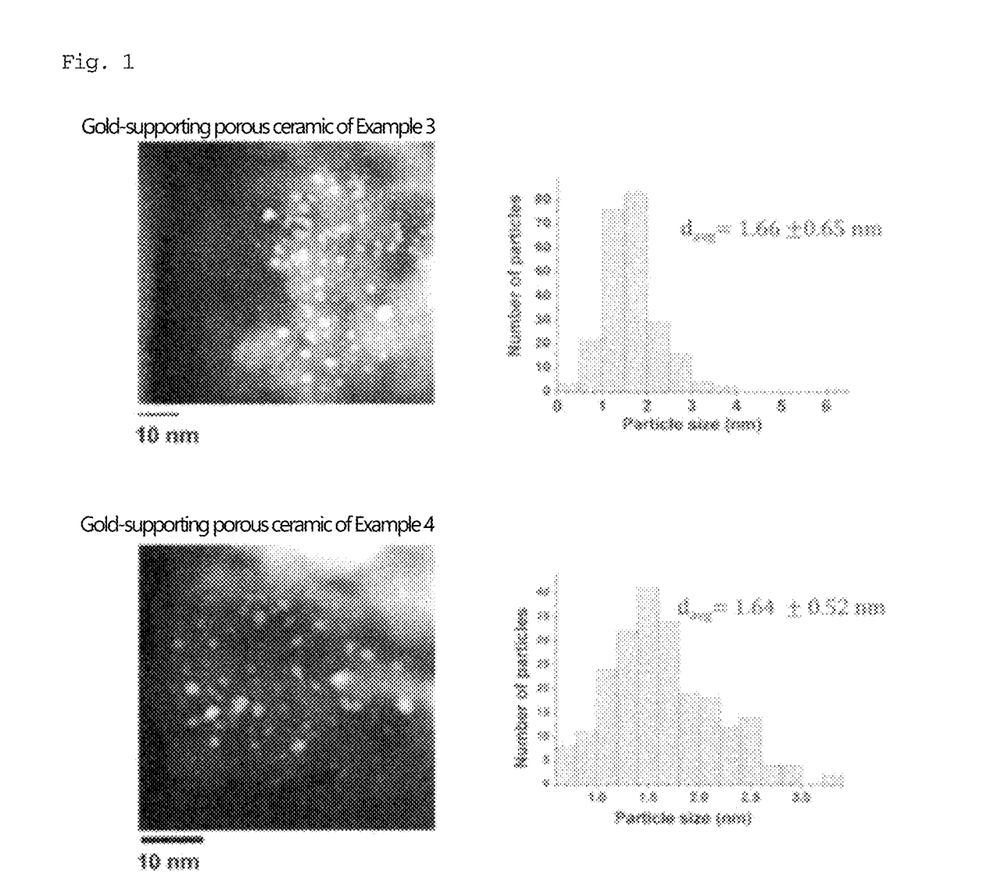
FIG. 1 shows TEM images of gold-supporting porous ceramic, and histograms of the gold particle size obtained from the observed images.

According to TEM observation of the gold-supporting catalysts of Examples 3 and 4, gold nanoparticles having an average diameter of about 1 to 3 nm were present on the porous ceramic, as shown in FIG. 1.

Catalytic Characteristics of Gold-supporting Catalyst (CO Oxidation Reaction)

The gold-supporting catalysts prepared in Examples 1 to 12 were placed in a glass reaction tube, and air containing 1% by volume of CO was passed through at a flow rate of 50 ml/min. The gas that passed through the gold-supporting catalysts was analyzed by gas chromatography, and the conversion from CO to CO$_2$ (also referred to below as "CO to CO$_2$ conversion") was determined. The "$T_{1/2}$ (° C.)" column in Table 1 shows the results of catalytic performance represented by an index of temperature $T_{1/2}$, at which the conversion was 50%. In Example 12, the conversion was 50% or less, and the index $T_{1/2}$ could not be shown.

Catalytic Characteristics of Gold-Supporting Catalyst in Environment with Water Content (CO Oxidation Reaction) No. 1

Figure 2:
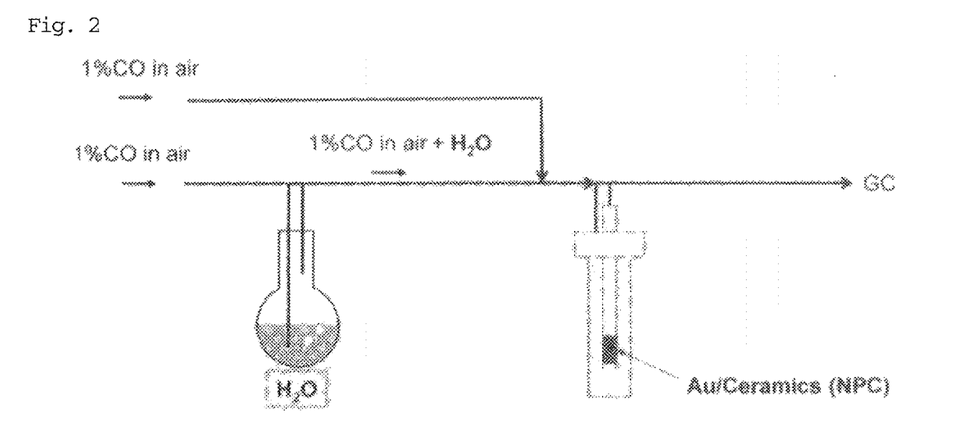
FIG. 2 is a schematic diagram showing the introduction of water during CO oxidation reaction.
Figure 3:
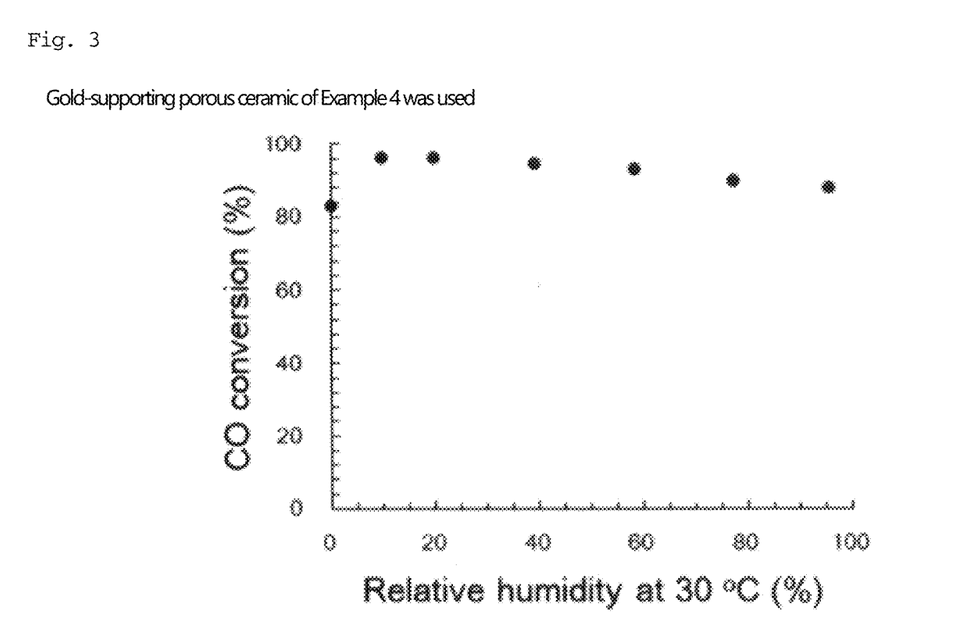
FIG. 3 is a graph showing relative humidity of introduced gas versus CO to $CO_2$ conversion.

The CO to CO$_2$ conversion was measured by introducing air containing 1% CO into the gold-supporting catalyst of Example 4 under various relative humidity conditions shown in Table 2 below with the device schematically illustrated in FIG. 2. Table 2 below and FIG. 3 show the results. In all of the measurements performed under the relative humidity conditions of 0.24% to 95.98% the CO to CO$_2$ conversion was 80% or more, indicating that the catalytic performance was excellent.

TABLE 2

| Relative humidity (%) | CO to CO$_2$ conversion (%) |
|---|---|
| 0.24 | 82.5 |
| 9.96 | 96.0 |
| 19.83 | 96.0 |
| 39.34 | 94.3 |
| 58.53 | 92.6 |
| 77.41 | 89.7 |
| 95.98 | 87.9 |

Catalytic Characteristics of Gold-supporting Catalyst in Environment with Water Content (CO Oxidation Reaction) No. 2

Figure 4:
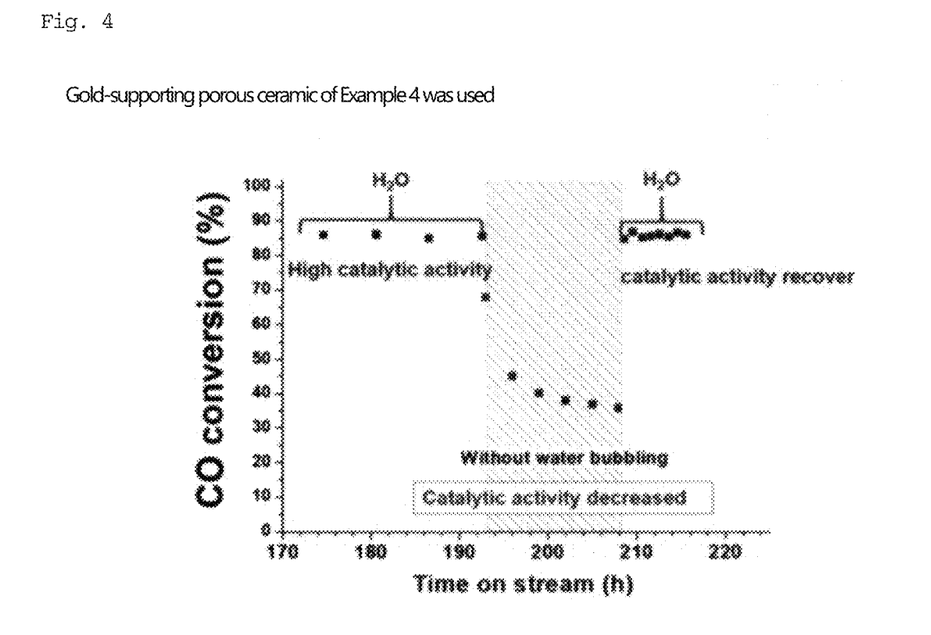
FIG. 4 is a graph showing CO to $CO_2$ conversion when CO oxidation reaction is continued with or without introducing water.

To demonstrate the relationship between the catalytic performance of the gold-supporting catalyst of the present invention and water content in a CO oxidation reaction, the measurement was performed with or without water content in the gas introduced to the catalyst. The measurement was performed using the gold-supporting catalyst of Example 4. The CO to CO$_2$ conversion was measured by introducing air containing 1% CO into the gold-supporting catalyst with the device shown in FIG. 2. During the measurement, the introduction of water was temporarily stopped, and then resumed. FIG. 4 shows the results. The CO to CO$_2$ conversion was about 85% during the introduction of water, and dropped to about 40% when the introduction of water was stopped. Thereafter, when the introduction of water resumed, the CO to CO$_2$ conversion returned to its original value, i.e., about 85%. While the measurement continued, when the state of with or without water was constant, stable CO to CO$_2$ conversion was maintained over tens of hours, as shown in FIG. 4.

Change in Size of Gold Before and After Use of Catalyst

Figure 5:
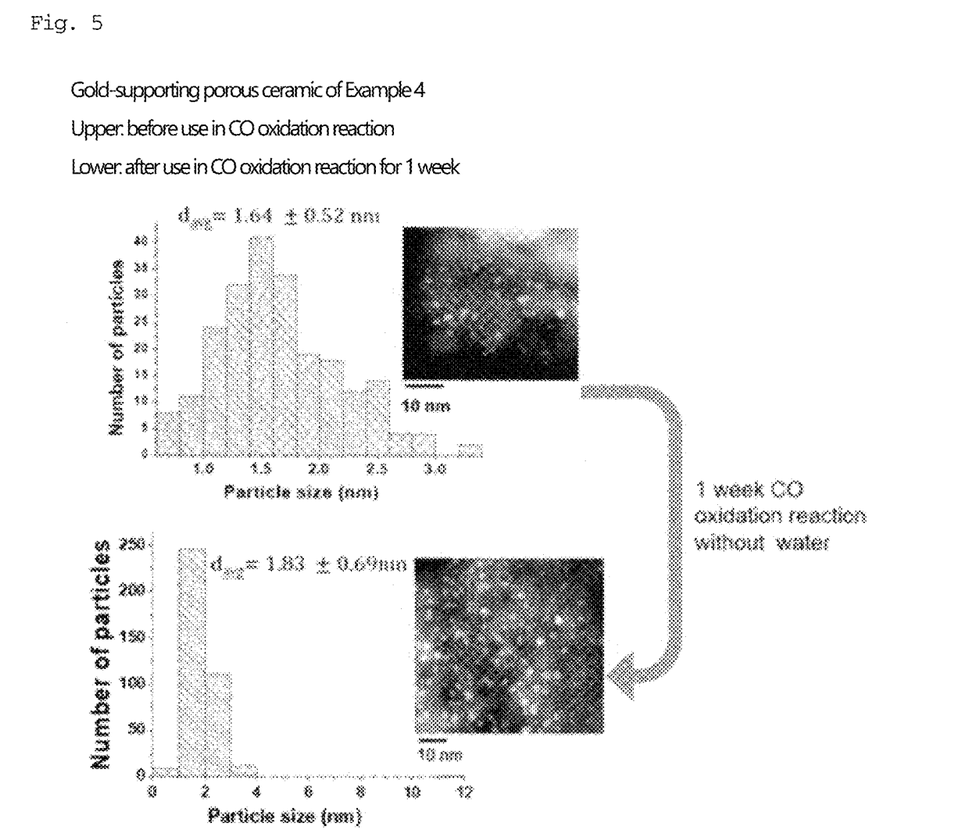
FIG. 5 shows TEM images of gold-supporting porous ceramic before and after use in CO oxidation reaction, and histograms of the gold particle size.

The degradation of nanosized gold catalyst performance has been conventionally considered to be caused by aggregation and coarsening of nanosized gold particles as a result of continued use. FIG. 5 shows TEM images of the gold-supporting catalyst of Example 4 before and after use. In FIG. 5, the upper image is a TEM image before use, and the lower image is a TEM image after use for one week in a CO oxidation reaction. The average sizes of the gold particles before use and after use calculated from the histograms obtained from the TEM images were 1.64 nm and 1.83 nm, respectively, and were thus almost unchanged. These results indicate that the coarsening of gold particles, which has been noted conventionally, did not occur in the gold-supporting catalyst of the present invention. This is presumed to have contributed to the above results such that stable CO to CO$_2$ conversion was maintained.

Relationship between Gold Loading Amount and CO Oxidation Catalytic Performance

Figure 6:
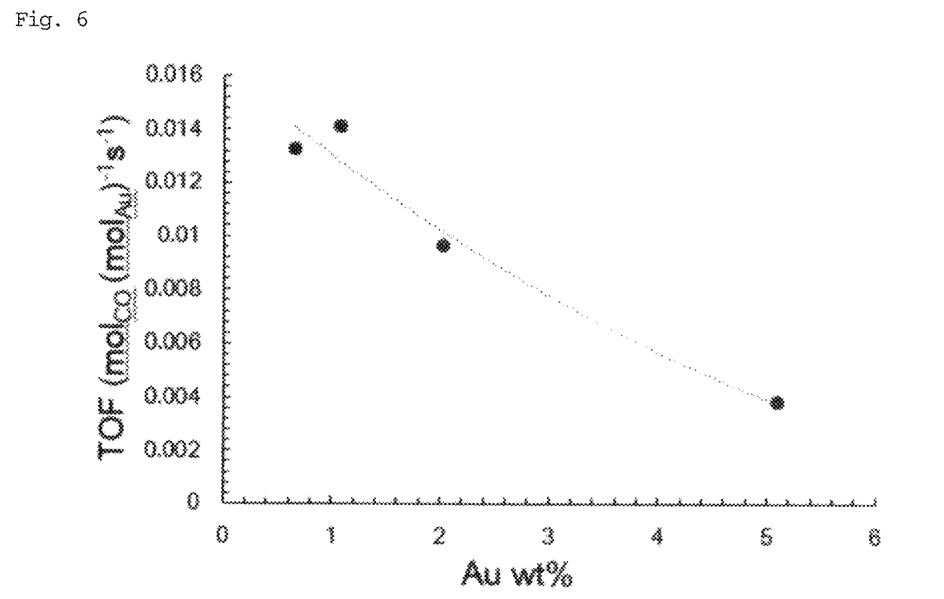
FIG. 6 is a graph of gold loading amount versus catalytic performance (TOF).

The relationship between the loading amount of nanosized gold particles and catalytic performance was evaluated using an index of TOF (turnover frequency, the number of reacting molecules per second per gold atom). Based on Examples 4, 8, 9, and 11 shown in Table 3, FIG. 6 shows a graph of the loading amount of gold particles versus TOF. Example 11 with a high gold loading amount (5.1% by mass) had a $T_{1/2}$ of 8° C., showing catalytic activity even at a temperature near room temperature. However, the TOF value of Example 11 was lower than those of Examples 4, 8, and 9, whose gold loading amount was 2% by mass or less. Thus, the gold loading amount and the catalytic performance are not necessarily positively correlated, and loading a large amount of gold is not deemed to be efficient considering the costs.

TABLE 3

| | Au loading amount (mass %) | TOF $(mol_{CO}(mol_{Au})^{-1}s^{-1})$ |
|---|---|---|
| Example 4 | 2.03 | 0.009631 |
| Example 8 | 1.08 | 0.014149 |
| Example 9 | 0.66 | 0.013271 |
| Example 11 | 5.10 | 0.003841 |

Relationship between CO Oxidation Reaction Temperature and Conversion

Figure 7:
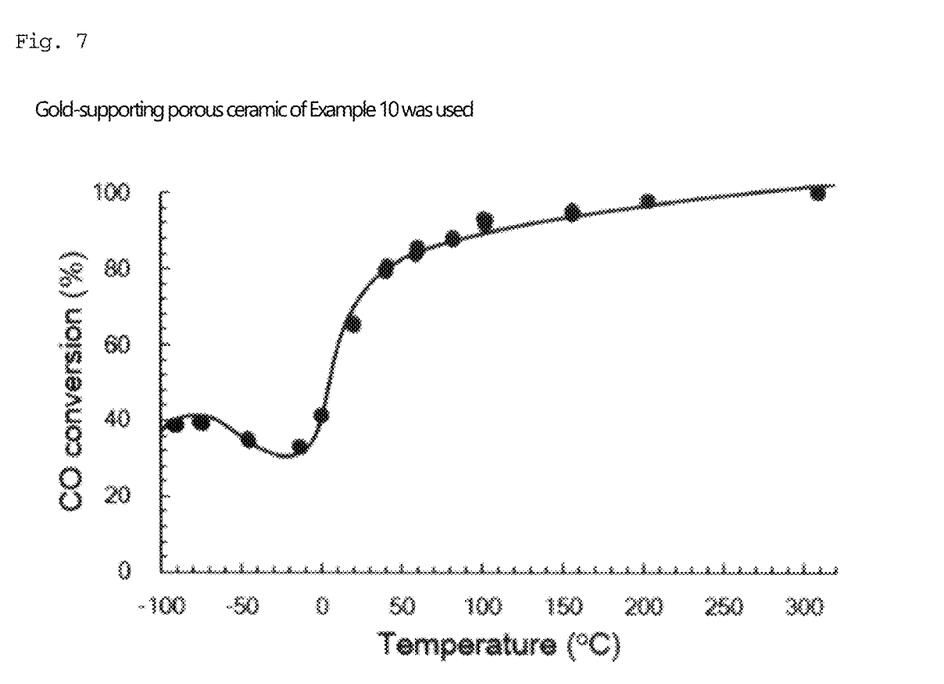
FIG. 7 is a graph of CO oxidation reaction temperature versus CO to $CO_2$ conversion.

Using the gold-supporting catalyst of Example 10, a CO 0° C. oxidation reaction was performed over a temperature range from or lower up to 300° C., and the CO to $CO_2$ conversion was measured. FIG. 7 show the results. Although the conversion varied depending on the temperature range, showing the minimum value of the conversion of about 33% at around −15° C., the results revealed that the gold-supporting catalyst of the present invention showed catalytic performance in a CO oxidation reaction over a wide temperature range from about −100° C. to about 300° C.

Comparative Example 1

Figure 8:
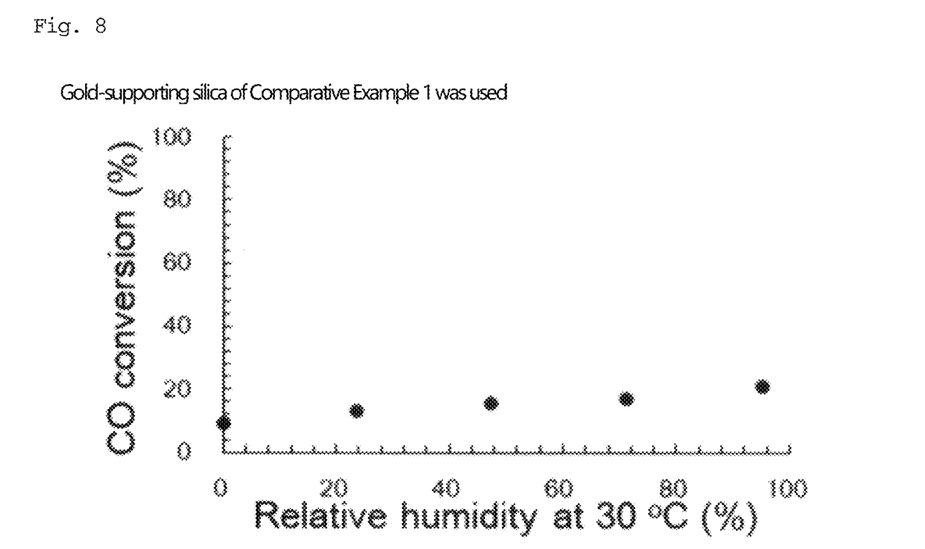
FIG. 8 is a graph of relative humidity of introduced gas versus CO to $CO_2$ conversion for Au/silica.

Case in which an Oxide Other than the Porous Ceramic of the Present Invention was Used as a Carrier The evaluation was performed by changing the carrier to silica. For the carrier silica, Q-10 produced by Fuji Silysia Chemical, Ltd. was used. Unlike in the Examples, gold was loaded by a precipitation-reduction method, in which gold is deposited by adding a reducing agent while a gold solution is in contact with a carrier. The catalytic performance in a CO oxidation reaction of the produced gold-supporting silica was measured at a reaction temperature of 30° C. by changing the water content in the introduced gas. Table 4 below and FIG. 8 show the results. The maximum CO to $CO_2$ conversion was 20.8% at a relative humidity of 95.6% and the CO to $CO_2$ conversion was below 50% at all of the measurement points. These results were inferior to those of the gold-supporting catalyst of the present invention (e.g., FIG. 3).

TABLE 4

| Relative humidity (%) | CO to $CO_2$ conversion (%) |
|---|---|
| 0.24 | 8.65 |
| 23.80 | 12.4 |
| 47.80 | 15.2 |
| 71.60 | 16.5 |
| 95.59 | 20.8 |

Comparative Example 2

Figure 9:
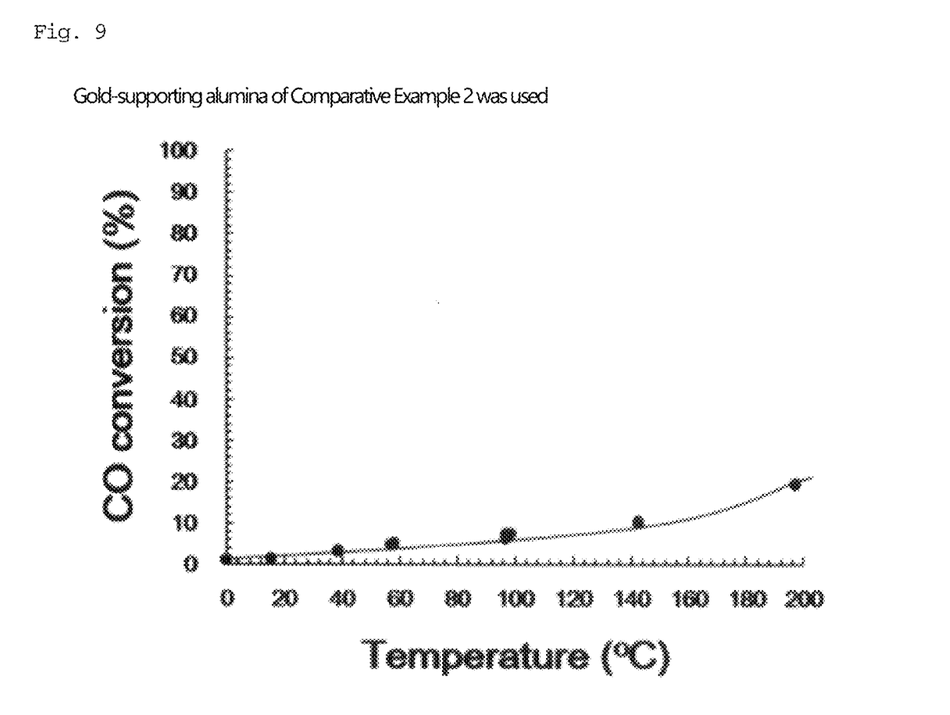
FIG. 9 is a graph of temperature versus CO to $CO_2$ conversion for Au/alumina.

Gold-supporting alumina was produced by using alumina (Sigma-Aldrich, product No. 414069-250G) as a carrier, and by loading gold in the same manner as in Examples 1 to 12. FIG. 9 shows the results of the CO oxidation catalytic performance of the gold-supporting alumina measured at various temperatures. The $T_{1/2}$ could not be determined because the CO to $CO_2$ conversion was below 50% over the entire measurement temperature range.

Comparative Example 3

Case in which Nanosized Gold Particles were not Loaded

Figure 10:
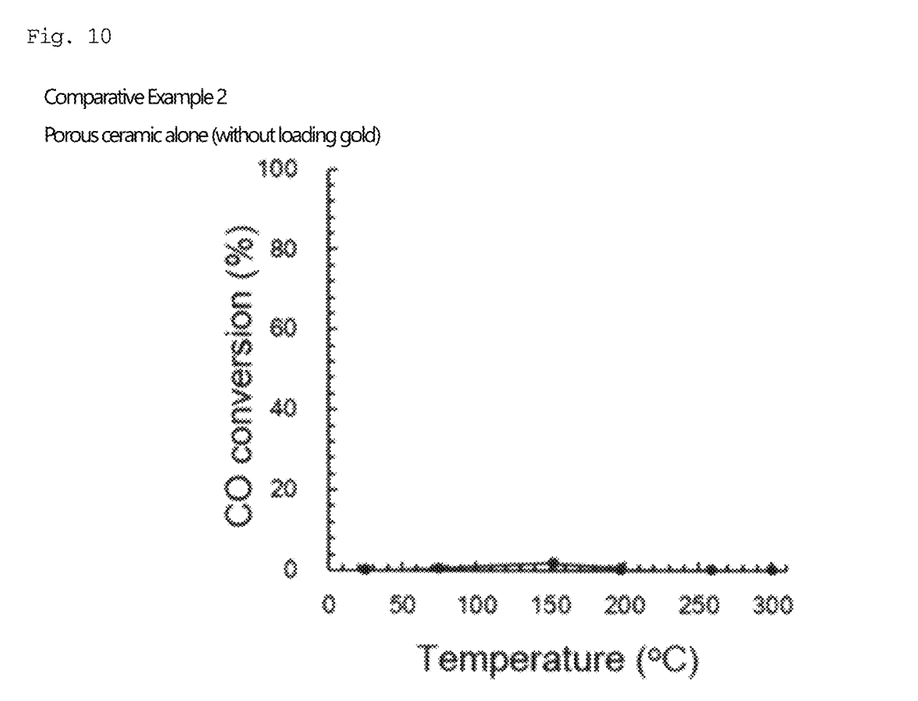
FIG. 10 is a graph of CO oxidation reaction temperature versus CO to $CO_2$ conversion for porous ceramic alone.

The porous ceramic used in each Example was used without loading gold (Comparative Example 3), and the catalytic performance in a CO oxidation reaction was measured. FIG. 10 shows the results. The CO to $CO_2$ conversion was 2% or less at all the measurement points in the temperature range of 25° C. to 300° C., showing almost no catalytic performance.

Relationship Between Gold Particle Size and CO Oxidation Catalytic Performance

Figure 11:
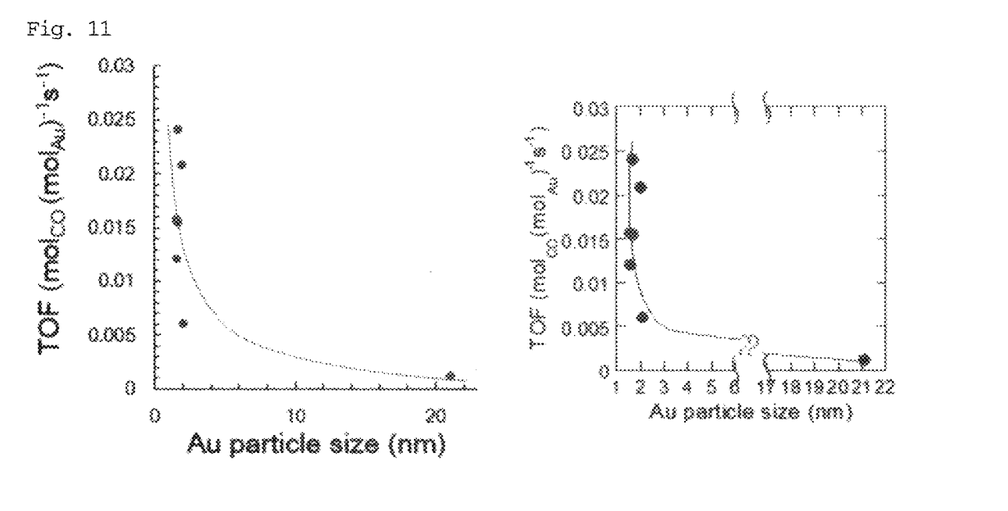
FIG. 11 is graphs of the supported gold particle size versus catalytic performance (TOF).

A comparison was made in terms of the relationship between the nanosized gold particle size and catalytic performance using TOF (turnover frequency, the number of reacting molecules per second per gold atom). Based on the gold-supporting catalysts of Examples 3, 7, 8, 9, 10, 11, and 12 shown in Table 5, FIG. 11 shows a graph of the gold particle size versus TOF. Example 12 (gold size: 21.1 nm, gold loading amount: 1.31% by mass) showed a 10 times or more different TOF value from those of Examples in which the gold size was 2 nm or less (Examples 3, 7, 8, 9, 10 and 11). These results suggest that the gold particle size affects the catalytic performance.

TABLE 5

| | Au particle size (nm) | TOF $(mol_{CO}(mol_{Au})^{-1}s^{-1})$ |
|---|---|---|
| Example 3 | 1.7 | 0.015476 |
| Example 7 | 1.6 | 0.011971 |
| Example 8 | 1.7 | 0.023983 |
| Example 9 | 2.0 | 0.020777 |
| Example 10 | 1.6 | 0.015685 |
| Example 11 | 2.1 | 0.006015 |
| Example 12 | 21.1 | 0.001156 |

The invention claimed is:
1. A gold-supporting catalyst comprising
    gold nanoparticles and
    a carrier consisting of porous ceramic obtained by firing a mixture comprising an aluminum compound, a lime component, and a plastic clay containing 1% by mass or less of feldspars and quartz, the porous ceramic having a BET specific surface area of 43 m²/g or less,
    wherein the gold nanoparticles are supported in an amount of 0.01 to 10 parts by mass on the carrier based on 100 parts by mass of the carrier.
2. The gold-supporting catalyst according to claim 1, wherein an average diameter of the gold nanoparticles is 10 nm or less.
3. The gold-supporting catalyst according to claim 1, wherein the aluminum compound is at least one member selected from the group consisting of aluminum hydroxide, aluminum hydrate, aluminum carbonate, and ammonium dawsonite ($NH_4AlCO_3(OH)_2$).

4. A method of using the gold-supporting catalyst of claim 1 comprising introducing a CO-containing gas into the gold-supporting catalyst in an atmosphere of a relative humidity of 0.1 to 100% and a temperature of −100 to 300° C.

\* \* \* \* \*

UNITED STATES PATENT AND TRADEMARK OFFICE
CERTIFICATE OF CORRECTION

PATENT NO. : 11,931,726 B2
APPLICATION NO. : 17/275088
DATED : March 19, 2024
INVENTOR(S) : Toru Murayama et al.

It is certified that error appears in the above-identified patent and that said Letters Patent is hereby corrected as shown below:

On the Title Page

Item (73)
Change:
(73) Assignee: TOKYO METROPOLITAN UNIVERSITY, Tokyo (JP); FUJI CHEMICAL INDUSTRIES, LTD., Osaka (JP); Yasuo Shibasaki, Sanyo-Onoda (JP)
To be:
(73) Assignee: TOKYO METROPOLITAN UNIVERSITY, Tokyo (JP); FUJI CHEMICAL CO., LTD., Osaka (JP); Yasuo Shibasaki, Sanyo-Onoda (JP)

Signed and Sealed this
Twenty-ninth Day of July, 2025

Coke Morgan Stewart
*Acting Director of the United States Patent and Trademark Office*